Figure 1:
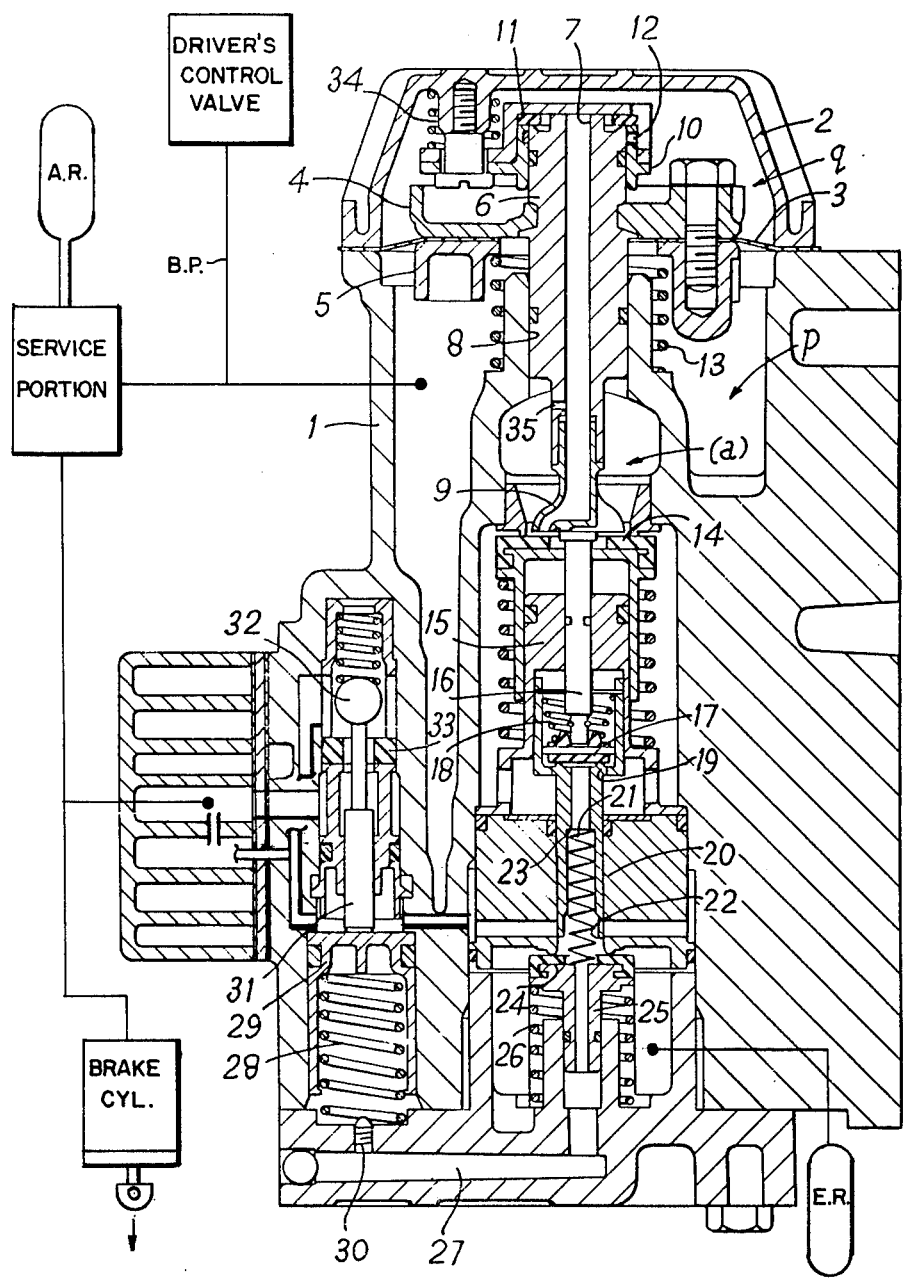

United States Patent [19]

Wickham

[11] 4,025,125
[45] May 24, 1977

[54] FLUID PRESSURE OPERABLE BRAKE CONTROL VALVE APPARATUS

[75] Inventor: David John Wickham, London, England

[73] Assignee: Westinghouse Brake & Signal Company Limited, London, England

[22] Filed: June 30, 1975

[21] Appl. No.: 591,320

[30] Foreign Application Priority Data

July 11, 1974 United Kingdom ............ 30850/74
Nov. 14, 1974 United Kingdom ............ 49279/74

[52] U.S. Cl. .................................... 303/33; 303/81
[51] Int. Cl.² ........................................ B60T 15/22
[58] Field of Search ................. 303/86, 81, 33, 28, 303/40, 46, 80, 82, 85, 68, 69, 37, 39, 43

[56] References Cited

UNITED STATES PATENTS

| | | | |
|---|---|---|---|
| 3,472,561 | 10/1969 | Washbourn | 303/81 X |
| 3,716,276 | 2/1973 | Wilson et al. | 303/82 |
| 3,731,983 | 5/1973 | Washbourn | 303/33 |
| 3,734,575 | 5/1973 | Paginton | 303/33 |

Primary Examiner—Trygve M. Blix
Assistant Examiner—Douglas C. Butler
Attorney, Agent, or Firm—Larson, Taylor & Hinds

[57] ABSTRACT

An emergency valve device for a direct release triple valve for use in braking systems is proposed and which for rates of fall of brake pipe pressure below a given rate permits a discharge via a restriction to atmosphere of quick action chamber reference pressure but for higher rates this discharge cannot keep up with the rate of fall of brake pipe pressure and the valve device moves further cutting off the restriction and produces a servo action to operate a vent valve connected to the brake pipe and produce an emergency application by connecting the emergency reservoir to the brake cylinders.

6 Claims, 2 Drawing Figures

A.R.-AUXILIARY RESERVOIR
E.R.-EMERGENCY RESERVOIR
B.P.-BRAKE PIPE

A.R.—AUXILIARY RESERVOIR
E.R.—EMERGENCY RESERVOIR
B.P.—BRAKE PIPE

FLUID PRESSURE OPERABLE BRAKE CONTROL VALVE APPARATUS

This invention relates to fluid pressure operable brake control apparatus and relates more particularly to an emergency braking control valve apparatus operable in response to more than a predetermined rate of change of controlling fluid pressure to supplement braking effort controlled by a service control valve portion.

In the Specification of U.S. Pat. No. 3,734,575 there has been described and explained a fluid pressure operable brake control valve apparatus for controlling in response to brake pipe pressure the supply of fluid pressure into and out of a brake cylinder, the apparatus including a pressure responsive member separating a chamber at brake pipe pressure from a chamber at quick action chamber pressure, a choke means being connected in series between said chambers so dimensioned as to render the member movably responsive only to at least a predetermined change of brake pipe pressure in a given time to open a brake cylinder valve to provide a communication between a fluid pressure reservoir and a brake cylinder, the apparatus including means operable on movement of the member away from an initial position in a direction to open the brake cylinder valve to influence a choke varying valve to increase the choke means resistance.

As will be appreciated if reference is had to the above mentioned patent the apparatus with which the patent is concerned is an emergency control valve apparatus of a combined service and emergency control valve for controlling the brakes of a rail vehicle. The emergency braking portion is operable in response to more than a predetermined change of brake pipe pressure in a given time, and the apparatus has the effect of opening a valve which vents the brake pipe and initiates a rapid emergency operation to open a valve which provides a communication between the emergency reservoir and brake cylinders, to supplement an otherwise normal service application effected by the service portion of the apparatus. Whilst the above described apparatus is satisfactory in many applications, it leaves to be desired certain consistencies of sensitivity arising out of the fact of the choke means between the chamber at brake pipe pressure and the chamber at quick action chamber reference pressure. As a result of this, the rate at which dissipation of quick action chamber pressure occurs following a reduction of brake pipe pressure is itself largely dependent upon the fall of brake pipe pressure, and therefore the predetermined change of brake pipe pressure is sensed by the apparatus by reference with a dependent variable. Owing to factors including the above, in the rate of operation of the emergency portion constructed as described in the aforesaid patent, speeds of response also leave something to be desired.

According to the present invention there is provided a fluid pressure operable brake control emergency valve apparatus for controlling in response to brake pipe pressure the supply of fluid under pressure into a brake cylinder, the apparatus including a pressure responsive member separating a chamber at brake pipe pressure from a chamber at a reference pressure, said pressure responsive member being responsive to at least a predetermined change of brake pipe pressure relative to the reference pressure in a given time to open a brake cylinder valve to provide a communication between a fluid pressure reservoir and the brake cylinder, the apparatus having means operable upon an initial movement of the pressure responsive member, in a direction to open the brake cylinder valve, to open a restricted passage between the chamber at reference pressure and atmosphere to permit the quick action chamber pressure to follow the rate of drop of brake pipe pressure towards the said predetermined rate, the apparatus also having means operable upon further such movement to at least partially reclose the said restricted passage and thereby enhance the further movement to unseat a brake pipe vent valve and open the brake cylinder valve.

In a preferred embodiment of the invention, the apparatus is such that greater than said predetermined rate of change is effective to impede said passage downstream of an appreciable reaction area which by virtue of quick action chamber pressure acting upon it is effective to enhance the said further movement.

Preferably the quick action chamber pressure is effective on said reaction area via a fixed restriction for said further movement.

By virtue of the presence of the said reaction area, improved response times of an emergency valve constructed in accordance with the preferred embodiment of the present invention, may be achieved.

Figure 2:
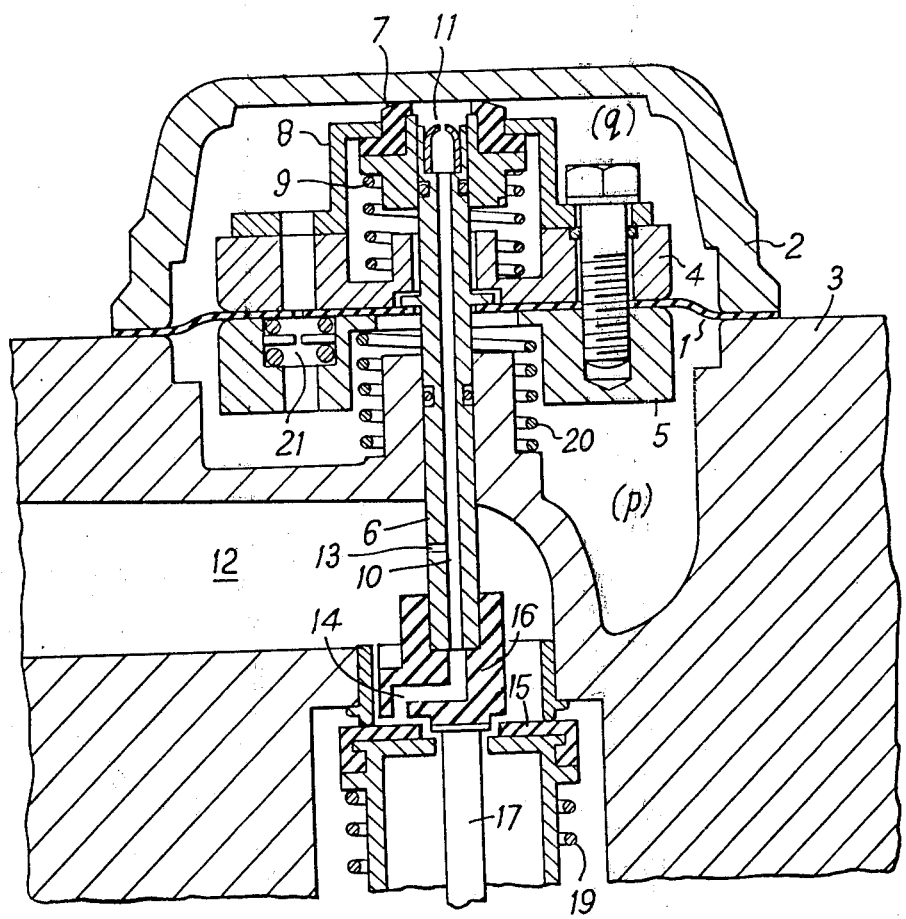

In order that the present invention may be more clearly understood and readily carried into effect, the same will be further described by way of example with reference to the accompanying drawings of which:

FIG. 1 illustrates an emergency portion of a brake control valve designed in accordance with the invention, and FIG. 2 illustrates an alternative but less preferred modification.

Referring to FIG. 1 of the drawings, the emergency valve shown includes a main body portion 1 which is formed as a casting with numerous internal apertures and machined regions which are readily apparent from the drawing and will not be all individually described in the present description. However, dealing with the main aspects of the arrangement, it includes, clamped between a cap portion 2 and the main body portion, a pressure responsive member formed by a diaphragm 3 which is itself clamped between a pair of follower members 4 and 5 which themselves carry a central generally cylindrical stem 6 having an internal bore 7. The stem 6 is sealingly slideable within a central bore 8 of the housing and carries at its lower end a metallic valve member denoted by reference 9. The valve member has an internal passage connecting with the bore 7 and opening into an annular groove in a lower flat surface of the valve member 9. The stem 6 extends upwardly to be sealingly slideable within a cylindrical portion 10 carried by the cap portion 2 of the valve resiliently movable against the action of three springs from the position shown towards the cap portion. One such spring is shown as spring 34. The upper end of the stem 6 is formed as a valve closure member co-operable with a rubber seat 11 and a fixed choke 12 is provided through the cylindrical portion 10 communicating with the region between the seat 11 and the seal carried by the stem 6, the communication being to the region $q$ above the pressure responsive member. The lower extension of the stem 6 which carries the valve portion 9, extends into a region $a$ of atmospheric pressure and by virtue of a spring 13 retained between the pressure responsive member and the housing, the valve member 9 is normally maintained in a position shown in which it is clear of the rubber seat of the vent valve member of the apparatus shown as reference 14. The vent valve member is formed as a sealingly slideable cylindrical member which is slideable on a central spigot 15 formed as part of a central core clamped within the body. The region surrounding the vent valve member 14 is at brake pipe pressure whereas the region within the valve member 14 is at atmospheric pressure in the position shown and the vent valve 14 is a pneumatically balanced arrangement having regard to the area of the vent valve seat which is subjected to atmospheric pressure. Within the central core 15 of the valve there is a push-rod at 16 which is also sealingly slideable within the core 15 such that in the position shown, wherein its upper end abuts the lower surface of the valve member 9, the lower end of the push-rod 16 engages a valve member 17. This valve member is therefore from the point of view of downward movement of the valve 14 and the rod 16, engaged with the rod 16 but if the rod 16 is allowed to move upwardly within the central core 15, the valve member 17 being then only under the influence of a light biassing spring 18, is able to operate in the manner of a check valve. The valve member 17 engages a valve seat 19 which is itself sealingly slideable within its guiding part 20 and is provided with a central bore 21 and lightly spring loaded in the upward direction by a spring 22 extending between a land 23 therein and further valve member 24. This valve member 24 is the high pressure valve which is provided between the brake cylinder and the emergency reservoir for providing the requisite pressure for supplementing the brake cylinder pressure under emergency braking conditions. The valve member 24 is provided on a tubular central stem 25 which is sealingly slideable within the housing and is upwardly spring loaded via a housed spring 26. A passage 27 is provided between the lower end of the tubular stem 25 of the high pressure valve and a region 28 which is provided under a piston 29 in an inshot valve arrangement. This communication with the inshot valve arrangement is via a restriction 30 and the upper side of the piston 29 in the position shown communicates via a push-rod 31 with a spring loaded ball valve 32 which in the position shown is lifted from its seat 33 thereby providing a supplementary low resistance path between the high pressure valve and the brake cylinders in known manner.

In operation of the emergency valve, the volume $q$ above the pressure responsive member is connected to a quick service volume which thereby operates as a reference pressure against the counter-balancing brake pipe pressure which is present in the volume $p$ beneath the pressure responsive member. It will be recalled moreover that the region surrounding the closed vent valve 14 is also connected to the brake pipe and that the volume $a$ above the vent valve 14 is at atmospheric pressure. Furthermore, particular attention is to be given to the fact that a 2mm fixed diameter choke 12 is provided which is normally sealed off from the central bore 7 of the stem 6 by virtue of the upper end of the stem 6 being in engagement with the seat 11. The pressure within the central bore of the stem 6 is therefore atmospheric pressure and this pressure appears substantially equally over the two ends of the stem 6 thereby achieving a substantially pneumatically balanced arrangement the upward bias being provided by the spring 13. Assuming that a slow fall of brake pipe pressure in the volume $p$ occurs relative to the reference pressure at $q$, this fall being say 10 p.s.i. per second, the pressure responsive member moves downwards slightly thereby providing a passage via the fixed choke 12 to atmosphere through the central bore 7 of the stem 6 such that a reduction of reference pressure in the volume $q$ can occur to counteract the reduction of pressure at $p$. Such a reduction of pressure at $p$ is not required to operate the emergency valve to supplement the service braking and the valve member 9 whilst approaching the valve member 14, does not engage it and therefore is not sealed off by such engagement. Indeed, by virtue of the relatively large area of the opening provided by the annular groove in the lower face of the valve member 9, substantially small impedance of the flow passage via the central bore 7 to atmosphere is caused by such downward movement of the valve member 9. Since therefore the pressures at $p$ and $q$ are allowed to stabilise again via the choke 12, the pressure responsive member recovers its initial position under the influence of the spring 13.

Considering now the state of affairs where the reduction of brake pipe pressure in the volume $p$ is greater than a predetermined rate of change namely say 25 p.s.i. per second, the excess pressure in the volume $q$ over that in the volume $p$ is such as to cause downward movement of the pressure responsive member carrying therewith the stem 6 and the valve member 9. In that circumstance, the loss of fluid pressure from the volume $q$ through the choke 12 into the central bore 7 and to atmosphere via the valve member 9 is not sufficient to counteract the rate of fall of pressure in the volume $p$ and therefore continued movement of the central stem 6 occurs such as to cause the valve member 9 to engage the valve member 14 and as soon as this engagement occurs, the central passage 7 is charged to quick action chamber pressure via the choke 12 and quick action chamber pressure in the volume $q$ is applied over the upper area of the stem 6 such as to create an enhancing effect equivalent to the additional area which is now subjected to the quick action chamber pressure. The action of the arrangement, far from being softened by the flow of air through the choke 12 into the passage 7, is now enhanced by the pressure difference between the volume $q$ and atmosphere, acting over the effective area of the stem 6. It will be seen moreover that this area includes the area of the passage 7.

The effect of this enhanced operation, is therefore to rapidly unseat the valve member 14 providing a communication between brake pipe and atmosphere. This resultant rapid drop of brake pipe pressure is reflected in the pressure of the volume $p$ and this also accelerates the action which is then regenerative. The downward movement of the member 9 is also communicated to the push-rod 16 and via the valve member 17, its seat 19 and thereafter to the high pressure valve member 24, which on being unseated provides a communication between emergency reservoir and the brake cylinders. The emergency reservoir pressure thus communicated to the brake cylinders enhances the service application on occurrence of the aforementioned rapid brake pipe drop. In the event of prolonged emergency application, the pressure in the quick action chamber may descend via the restricted passage 12, bore 7 and restricted passage 35 to a value which is such as to permit the bias spring 13 and the further springs in the system to enable the various valves to readopt the position shown in the drawing. In any case in the event of an earlier occurrence of a brake pipe recovery, to release the brakes, the pressure responsive member moves upward through and beyond the position as shown against the springs such as 34. Indeed, at a position beyond that which is shown the valve member 19 not only unseats from the reseated vent valve member 14 but also clears the central rod 16 thereby enabling the housing of the valve 17 to rest against its upper stop in 15 and 17 can then operate in the manner of a check valve. Valve 17 thus affords accelerated release by providing a one way communication between the brake cylinder and the brake pipe via the region which surrounds the vent valve member 14. After subsequent recharge of the quick action chamber $q$, the system returns to the stable release position shown.

Referring now to the inshot valve, this consists of the lightly sprung retained ball valve 32 in a region connected to the output side of the high pressure valve via a passage not shown and the underside of the valve seat 33 which is common with the top of piston 29 is connected to the brake cylinder. Accordingly, when the emergency valve operates the communication with the brake cylinders which is ordinarily provided via the bore in stem 25 to the underside of piston 29 is cut off enabling the closure of ball 32 onto its valve seat 33 to occur at a value of brake cylinder pressure, of about 15 p.s.i. as determined by the spring bias beneath piston 29. After an inshot of up to 15 p.s.i. into the brake cylinder the valve 32 therefore closes and the remaining rise of brake pressure during an emergency operation is achieved via a more restricted path and by admixture with service air, a smooth application up to maximum braking thereby being produced.

The arrangement shown in FIG. 2 of the drawings is a less preferred arrangement and the drawing only shows the diaphragm assembly and the vent valve, the remainder being substantially as shown in the said patent. The chamber at quick action chamber pressure is again denoted by the reference $(q)$ and the chamber at brake pipe pressure is denoted by the reference $(p)$. These chambers are separated by a diaphragm 1 which is clamped between body portions 2 and 3 and the diaphragm carries a follower formed of two parts 4 and 5, between which the central portion of the diaphragm is clamped allowing a sufficient peripheral flexible part of the diaphragm to enable upward and downward movement of the assembly. The assembly carries a central actuating rod 6 sealingly slidable within a bore in the body portion 3 and retained within the pressure responsive member formed of the assembly of the diaphragm and portions 4 and 5. Clamped to the upper portion 4 of the assembly is a rubber valve member 7 which is retained by a part 8 and spring loaded upwards against said part by a housed spring 9. In the position shown therefore the valve member 7 sealingly engages the upper surface of part 2 and thereby separates from the chamber $(q)$ a central bore 10 of the stem 6. Within an upper aperture of the bore 10 there is included a restriction choke denoted by reference 11 and communicating between the bore 10 and atmosphere at 12 there is a further small restricted passage denoted by reference 13. The lower end of the stem 6 which projects into the atmospheric region 12 carries a valve member 16 formed of aluminium but could be zinc or plastic material and this has an internal passage formed as shown so that when the stem 6 is downwardly deflected, the passage 14 is closed off by abutment with the upper rubber surface of a valve closure member 15 of the vent valve of the apparatus. The vent valve 15 in the position shown normally is closed against its seat and isolates the region at brake pipe pressure from the atmospheric region 12. The lower surface of the member 16 abuts a lower push-rod portion 17 which directly mechanically operates the brake cylinder valve in a manner similar to that described and illustrated in the above numbered patent. Two further springs are included the first being a spring 19 which urges the vent valve 15 into the position shown against its seat and the second spring comprises the spring 20 which urges the pressure responsive member into the position shown in which the valve member 7 is urged against the inner surface of the part 2. For the purposes of charging the quick action chamber $(q)$ from the chamber $(p)$ which is at brake pipe pressure, a further choke denoted by reference 21 is provided which communicates between the chamber $(p)$ and the chamber $(q)$. As will be seen flow of air can occur in either direction through the choke 21.

In operation of the portion of the apparatus which is illustrated in the drawing, it will be understood that the apparatus normally is provided in conjunction with a service portion which applies a fluid pressure to brake cylinders from an auxiliary reservoir dependent upon the amount of reduction of brake pipe pressure which is effected by a driver's brake valve or other means. The emergency portion whilst always connected, is required to operate only in the event of a rapid rate of reduction of brake pipe pressure corresponding to an emergency application. In this event, its function is to connect an emergency reservoir which is normally charged to the same pressure as the fully charged auxiliary reservoir, to brake cylinder and to vent the brake pipe to atmosphere thereby achieving a full emergency application which is largely independent of the amount of service application which exists at the time.

Normal fluctuations of the pressure in the chamber $(p)$ corresponding to normal service applications therefore are such as to cause flow of air through the choke 21 in either direction and reductions of the pressure in the chamber $(p)$ may be sufficient to cause an initial small deflection of the pressure responsive member in a downward direction such as to unseat the valve 7 to a certain degree from the inner surface of the part 2. In this event, the pressure in the quick action chamber $(q)$ is permitted to follow the reduction in the brake pipe pressure in the chamber $(p)$ by dissipation of the pressure in the chamber $(q)$ via the valve 7, the choke 11, the bore 10 and the passage 14 in the member 16 to atmosphere. Flow is also possible at this time via the restriction 13 from the bore 10 to atmosphere. So long therefore as the rates of change of the pressure in the chamber $(p)$ do not exceed a predetermined rate governed by the rate at which the quick action chamber $(q)$ can dissipate to atmosphere, the pressure responsive member is not deflected further. The valve 15 and the brake cylinder valve, operated by the rod 17, remain closed. Subsequent recoveries of brake pipe pressure in the chamber $(p)$ causes the pressure responsive member to revert to its initial position and the pressure recovery of the quick action chamber $(q)$ takes place via the choke 21.

Considering now a drop of pressure in the chamber $(p)$ corresponding to a more rapid reduction of brake pipe pressure, the choke 11 is such that it cannot accommodate a following of the quick action chamber pressure sufficient to compensate for the drop in brake pipe pressure and the pressure responsive member not only makes the initial small movement to open the valve 7 but also executes a further movement which at once recloses the passage 14 by abutment of the member 16 with the valve closure member 15 of the vent valve and precipitates a further downward deflection of the pressure responsive member to unseat the valve 15 and thereby vent the brake pipe precipitating an emergency application. Following such an application, the pressure in the quick action chamber ($q$) continues to dissipate via the choke 11, the bore 10 and the restriction 13 and also via the choke 21 until the pressure responsive member recovers its starting position under the influence of the spring 20. During this movement the valve 15 recloses in readiness for a release of the brakes on subsequent recovery of the brake pipe pressure.

From the foregoing, whilst it is clear that on a reduction of pressure at ($p$), the pressure at ($q$) is allowed to leak to atmosphere as also happens in the apparatus of FIG. 1, it will be understood that except for the condition in which the valve 7 is very close to the part 2 such that initially no pressure difference exists across the choke 11, once 7 has moved away from 2 under the influence of a pressure change at ($p$), the area of the stem 6 is subject to a pressure difference tending to move the valve apparatus towards emergency operation. The arrangement of FIG. 2 is therefore less preferred because FIG. 2 lacks the marked onset of servo action which occurs in the FIG. 1 arrangement when the central passage of stem 6 is closed on engagement between 16 and 15. In FIG. 1, only at this point does the area of stem 6 become effective to bias the apparatus towards an emergency operation.

Having thus described our invention what we claim is:

1. A fluid pressure operable brake control emergency valve apparatus for controlling in response to brake pipe pressure the supply of fluid under pressure into a brake cylinder, comprising a pressure responsive member separating a chamber at brake pipe pressure from a chamber at a reference pressure, a brake cylinder valve, a brake pipe vent valve, said pressure responsive member being responsive to at least a predetermined change of brake pipe pressure relative to the reference pressure in a given time to open said brake cylinder valve to provide a communication between a fluid pressure reservoir and the brake cylinder, a normally closed restricted passage between said reference pressure chamber and atmosphere, the apparatus having means operable upon an initial movement of the pressure responsive member, in a direction to open the brake cylinder valve, to open said restricted passage between the chamber at reference pressure and atmosphere to permit the reference chamber pressure to follow the rate of drop of brake pipe pressure towards the said predetermined rate, the apparatus also having means operable upon further such movement to at least partially reclose the said restricted passage and thereby enhance the further movement to unseat said brake pipe vent valve and open said brake cylinder valve.

2. A fluid pressure operable brake control emergency valve as claimed in claim 1, said means operable upon said further movement including valve means which is included in said passage downstream of a reaction area which on closure of the valve means gives rise to appreciable added effective area in the pressure responsive member which is subject to the reference pressure.

3. A fluid pressure operable brake control valve as claimed in claim 2, said restricted passage being so restricted by a fixed restriction between the said reaction area and said chamber at reference pressure.

4. Apparatus as claimed in claim 1 wherein said means operable upon an initial movement comprises a member normally closing said restricted passage but moveable with said pressure responsive member relative to at least part of said restricted passage to open said restricted passage.

5. Apparatus as claimed in claim 1 wherein said means operable upon an initial movement is responsive to the position of said pressure responsive member.

6. Apparatus as claimed in claim 5 wherein said passage includes an orifice, and said means operable upon an initial movement moves relative to said orifice in response to movement of said pressure responsive member to selectively open or close said orifice depending upon the direction of movement and the current position of said pressure responsive member.

* * * * *